(12) United States Patent
O'Donnell et al.

(10) Patent No.: US 6,549,143 B1
(45) Date of Patent: Apr. 15, 2003

(54) UNIVERSAL REMOTE CONTROL METHOD AND APPARATUS

(75) Inventors: Eugene M. O'Donnell, Fishers, IN (US); Lori Rene Bolduc, Westfield, IN (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 0 days.

(21) Appl. No.: 09/471,073

(22) Filed: Dec. 22, 1999

(51) Int. Cl.[7] .............................................. G08C 19/00
(52) U.S. Cl. ............................. 340/825.69; 340/825.72
(58) Field of Search ..................... 340/825.57, 825.69, 340/825.72, 825.37, 568.1, 693.1; 348/563, 734

(56) References Cited

U.S. PATENT DOCUMENTS

| | | | | |
|---|---|---|---|---|
| 4,623,887 A | | 11/1986 | Welles, II | 340/825.69 |
| 4,626,848 A | * | 12/1986 | Ehlers | 340/825.69 |
| 4,728,949 A | * | 3/1988 | Platte et al. | 340/825.37 |
| 4,769,643 A | | 9/1988 | Sogame | 340/825.69 |
| 4,866,434 A | | 9/1989 | Keenan | 340/825.72 |
| 5,081,534 A | * | 1/1992 | Geiger et al. | 340/825.69 |
| 5,410,326 A | | 4/1995 | Goldstein | 340/825.72 |
| 5,818,127 A | * | 10/1998 | Abraham | 340/310.07 |
| 6,055,244 A | * | 4/2000 | Wall, Jr. et al. | 370/487 |

* cited by examiner

*Primary Examiner*—Van Trieu
(74) *Attorney, Agent, or Firm*—Joseph S. Tripoli; Robert D. Shedd; Reitseng Lin

(57) ABSTRACT

A remote controllable device, apparatus or appliance such as a television is adapted to receive control signals from a universal remote control device addressed to a different appliance, i.e., when said appliance has not been selected, and informs the user that said appliance is not selected. Preferably the appliance displays information as to which other appliance has been selected, for example the TV could display on its screen the fact that it is receiving a remote control signal pertaining to a VCR by saying "VCR selected" when it receives a VCR control signal.

9 Claims, 3 Drawing Sheets

UNIVERSAL REMOTE CONTROL METHOD AND APPARATUS

BACKGROUND OF THE INVENTION

This invention pertains to the field of universal remote control for appliances.

It is now common practice to include a 'multi-function' or 'Universal' remote control (URC) hand held transmitter with many consumer products (also referred to herein as devices, apparatus or appliances) such as televisions, video cassette recorders (VCR), digital video disk players (DVD), satellite receivers, compact disk players, and audio systems, to name a few. The advantage of URC's is that the consumer can control not only the particular appliance with which it was sold (hereinafter referred to as "first" appliance), but the consumer can use the same device to control any of the other appliances (hereinafter referred to as "different" appliance).

Because of the need to be able to control so many different appliances, i.e., TV, VCR, DVD, cable, satellite, stereo, and others, it has become common practice to provide one or more "soft" keys on the URC to select the device which is being addressed by the remote control at a particular time. Each time such soft key is pressed, the URC is programmed to toggle between controlling each different appliance. In the case of one such soft key, if the URC is currently controlling the TV, pressing such soft key once may toggle the control to VCR, whereas pressing it twice may toggle it to DVD. In the case of separate soft keys for each type of appliance, the URC may have one soft key for toggling the URC to control the TV, and another soft key to toggle the URC to control a first VCR, and yet another to toggle the URC to control a second VCR, and so on.

Whether a single soft key is used to cause the URC to toggle between controlling different appliances or one soft key is provided for each type of different appliance, the person using the URC frequently does not remember which appliance is "active" in the URC microprocessor, i.e., the person does not remember which appliance the URC was last toggled to, and becomes confused, frustrated, and annoyed. In some cases the person believes he is controlling the TV after having inadvertently pressed the VCR device soft key and is unable to change the TV channel with a control key, or use any of the "mapped" keys (i.e., the keys which control other functions) until he uses the soft key to toggle back to the TV. With current technology, an appliance which is not selected via the URC soft key(s) "ignores" signals used to control the other appliances. In some cases this problem has resulted in unjustified warranty claims.

SUMMARY OF THE INVENTION

It is an object of this invention to solve the problem of URC users not knowing which device, apparatus or appliance has been selected for control. Another object is to provide improved URC's, which are more convenient and user friendly with respect to warning the user when he is trying to control a device which has not been selected.

These and other objects are solved by the present invention which comprises in one aspect a system comprising a first remote controllable appliance and a universal remote control transmitter having a selection key for selecting for control either the first remote controllable appliance or a different remote controllable appliance and having control keys for causing a control signal to be transmitted for controlling the selected appliance, wherein the first appliance responds to control signals for a different appliance by indicating that the selected appliance is not the first appliance.

The first appliance can either indicate that a different appliance has been selected, or it can indicate which different appliance has been selected by interpreting control signals received from the URC.

The URC, which includes a microprocessor, is generally programmed to transmit a selected appliance identification code along with control code when a control key is pressed. Previously a soft key would have been pressed to toggle the appliance selection routine in the microprocessor, and so the selected appliance identification code can be called up and transmitted along with code transmitted in response to control key presses.

The first appliance must have a display, a synthetic voice generation system, or another indication system and a microprocessor which interprets received code from URC transmissions. As with prior art appliances, the first appliance is programmed to respond to a control code for that first appliance in the normal way, but the first appliance according to this invention is programmed to also respond to an appliance identification code which is transmitted along with control codes for other appliances which may be selected or toggled within the transmitter, and indicate which other appliance has been selected, or merely the fact that another appliance has been selected.

For example, a TV may display text such as "VCR" in the channel indicator location when the user tries to press a TV oriented control button when VCR has been selected. In another example, if a VCR is the first appliance and the user has used a soft key to toggle to the transmitter to control the TV and then tries to control the VCR by pressing PLAY, for example, the VCR may display the word "TV" to indicate the toggle state, or it may generate a synthetic voice indication saying "TV selected." In this way, the user can know which remote mode is being used.

There are several advantages to the new technique, for example the low cost in that it can be implemented with only a bit more code space in an appliance, that power consumption is not affected, and that no additional display means or voice generator is required over and above the ordinary display or voice generator on the same branded appliance.

In a preferred embodiment, the supplier of the URC transmitter and the first appliance, e.g., a TV, would program the URC to transmit the selected device code at the beginning of the transmission of a control signal for each possible other device, or at the end of such a control signal. Thus, the control transmission would include the code format for controlling the different appliance, which the TV would not normally have recognized, and also code identifying the selected appliance which the TV would recognize. In this way, the receiver coding is simplified, and a very small code change is needed for the URC.

This can easily be embodied in any TV, VCR, or other device which decodes wireless (IR,RF, Sonic, etc.) remote commands, and generates an on-screen display, or front-panel indicator, voice, or any other audio or visual indicator.

BRIEF DESCRIPTION OF THE DRAWINGS

The invention is explained in more detail below with reference to exemplary embodiments, using the drawings.

DETAILED DESCRIPTION OF THE PREFERRED EMBODIMENT

Figure 1:
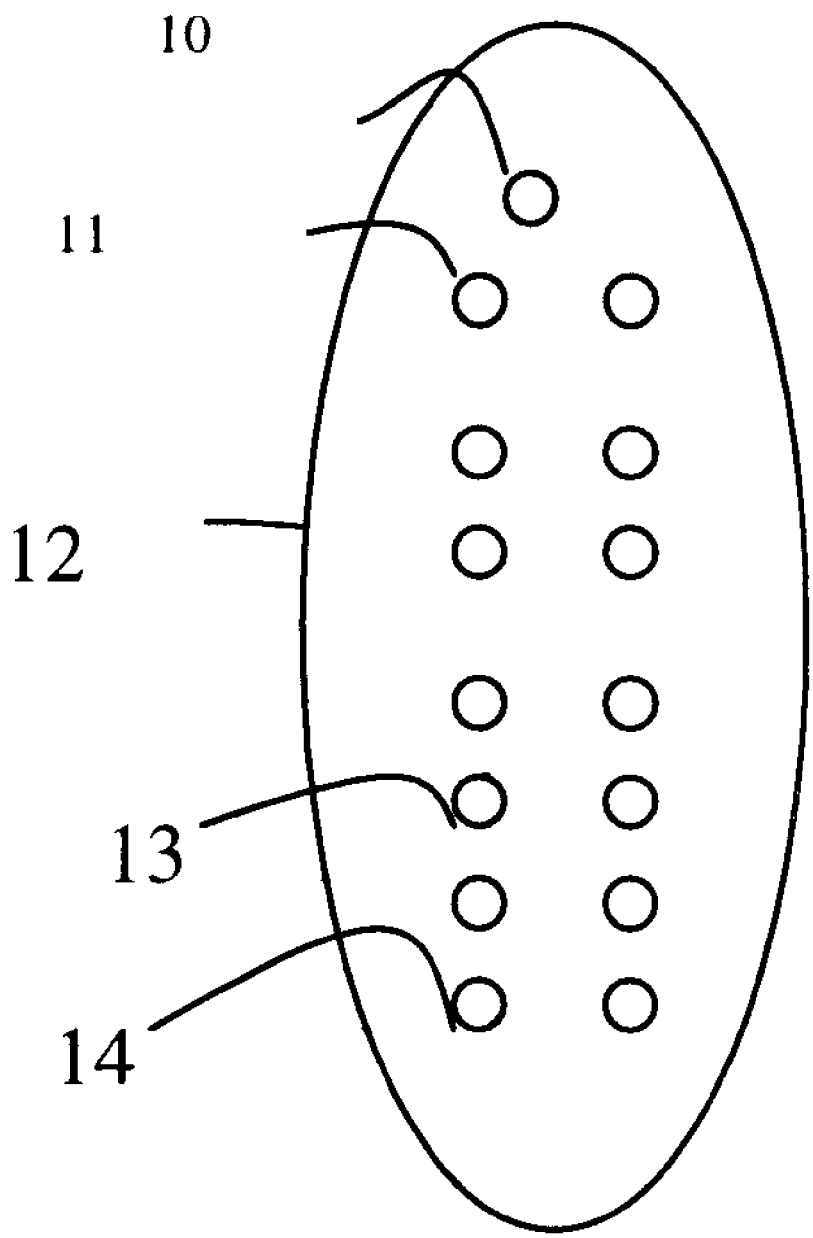
FIG. 1 illustrates an embodiment of a hand held remote control transmitter.

Referring to FIG. 1, a hand held universal remote control transmitter 12 is provided with control keys 13, 14, etc., and one or more appliance selection keys 11, 10, etc., which cause the microprocessor to toggle between control of the various appliances. For example, the microprocessor can be toggled to control either a television, VCR, DVD, audio system, satellite receiver, cable box, an oven, or any of a wide variety of appliances. Pressing the control keys 13, 14, etc., causes the microprocessor to instruct the transmitter to send a control code, but different control codes are sent by pressing a single control key, depending on which appliance is selected or toggled in the transmitter microprocessor memory. For example, if the universal remote control transmitter has been toggled to control a VCR, pressing the ON control key will cause the microprocessor to cause the transmitter to send the ON control code which is received by the VCR and processed to control the ON function of the VCR, but that code has no effect on the other appliances which may receive it, for example the television, audio system, etc.

Figure 2:
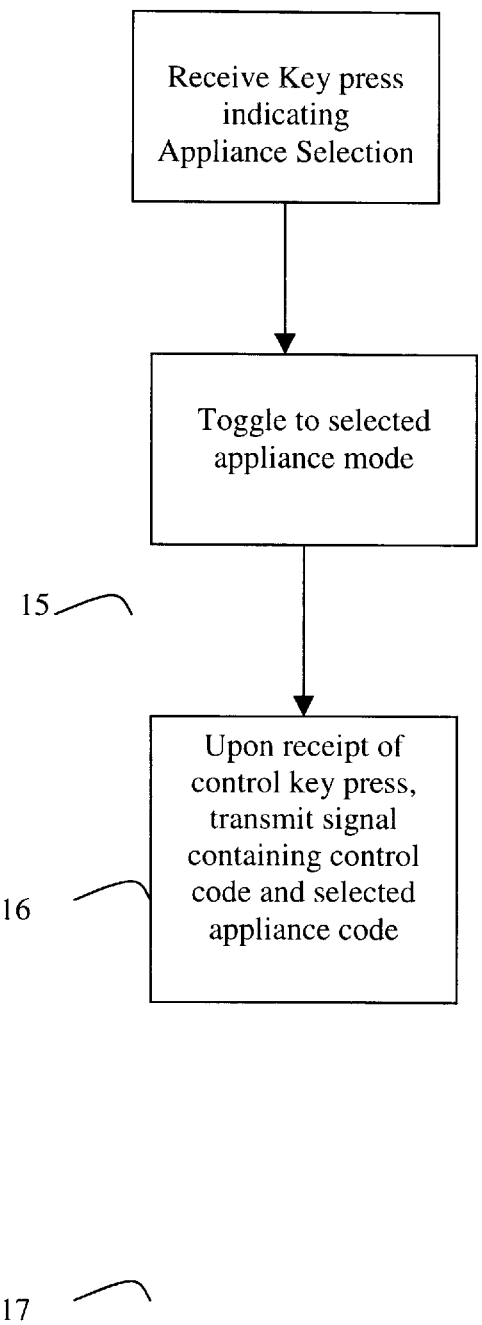
FIG. 2 shows a block diagram of a remote control microprocessor logic.

Referring now to FIG. 2, upon receiving a signal indicating an appliance selection key has been pressed, the microprocessor toggles 16 the control logic to control the selected appliance. For example, with a remote control device which has a single select key, one press may toggle the control to VCR. With a remote control device which has one select key dedicated to each controllable appliance, pressing the corresponding select key such as VCR will toggle the microprocessor control logic to the VCR control routine.

When a control key on the remote control device is pressed, for example. the ON key, the microprocessor responds 17 to the key press by transmitting a code which comprises both the VCR-ON code and the VCR SELECTED code.

Figure 3:
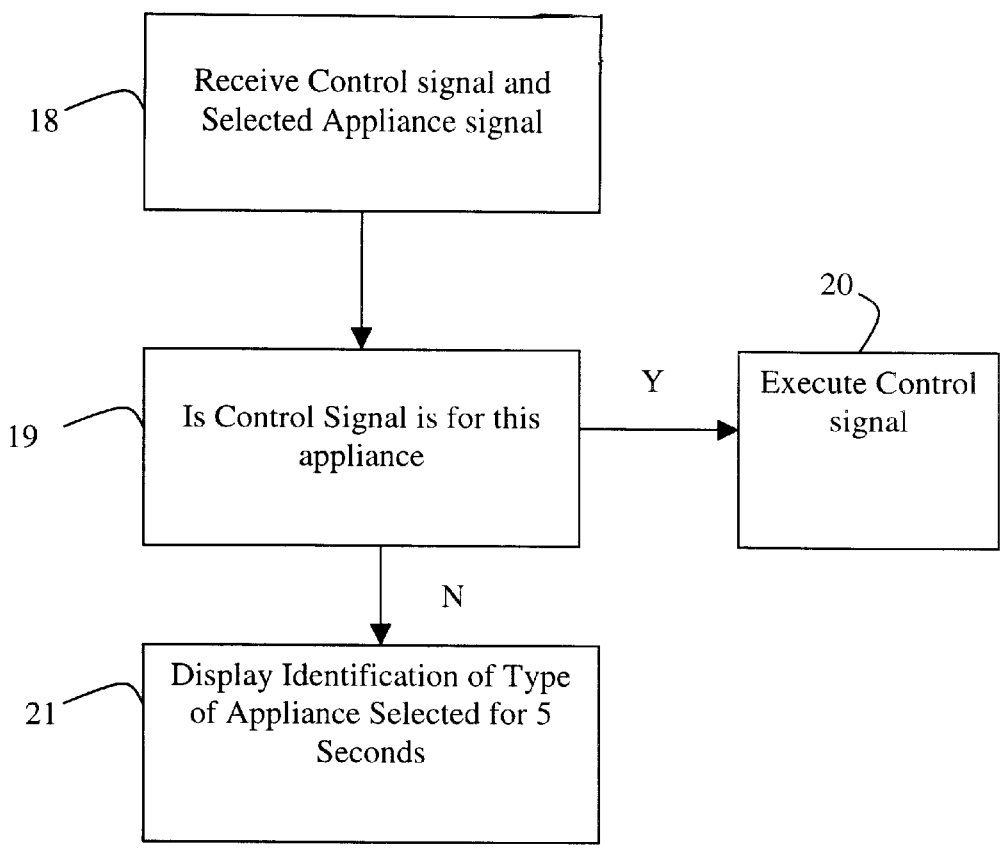
FIG. 3 shows a block diagram of the microprocessor logic for a controllable appliance.

Referring to FIG. 3, the first appliance, in this example the television, receives 18 the control and appliance selected code, or VCR-ON and VCR SELECTED in this example, and the microprocessor within the television checks or tests as to whether the code is for the television and if so, it executes the control instruction. As with conventional systems, the television does not execute control instructions on receipt of any remote controller code unless the code corresponds to code programmed in its microprocessor. However, the first appliance, e.g., television, microprocessor is programmed to interpret appliance selected code, in this case VCR SELECTED, and display 21 an indication as to the type of appliance selected on the VCR, in this case the words "VCR SELECTED" superimposed on the television display.

While the invention has been described with respect to certain embodiments, various modifications, alternative embodiments, improvements, and variances should become readily apparent without departing from the spirit and scope of the invention.

What is claimed is:

1. A universal remote control system comprising
   a remotely controllable TV receiver; and
   a universal remote control transmitter having a selection key for selecting for control either said TV receiver or a different remotely controllable device and having control keys for causing a control signal to be transmitted for controlling the TV receiver or the different device;
   wherein the TV receiver responds to control signals for said different device by a synthetic voice response indicating that the different device is being controlled and is not the TV receiver; and wherein
   said universal remote control transmitter is voice activated for selecting either said TV receiver or said different device.

2. System of claim 1 wherein the TV receiver indicates which of a plurality of different devices has been selected.

3. System of claim 2 wherein said plurality of different devices are each selected from the group consisting of video cassette recorders, cable boxes, audio systems, Satellite decoders, DVD players, and DBS receivers.

4. System of claim 1 wherein the TV receiver has a display and indicates which different device has been selected by displaying the identity of the selected device.

5. System of claim 1 wherein the universal remote control transmitter is programmed to transmit both a device identification code and a control code in response to a control key press.

6. An apparatus comprising
   (a) a universal remote control transmitter capable of selectively controlling more than one remote controllable device, having means for selecting one device for control at a time,
   (b) a first remote controllable device consisting of a TV receiver adapted to generate display information and synthetic voice information upon receipt of a signal from said transmitter at a time when said TV receiver has not been selected which indicates that said selected one device is not said TV receiver; and
   (c) said means for selecting one device for control at a time includes voice activation means in said universal remote control transmitter.

7. Apparatus of claim 6 wherein said first remote controllable device is adapted to recognize control signals from said transmitter which pertain to different devices and to process said signals to generate said display and synthetic voice information.

8. Apparatus of claim 6 wherein said first remote controllable device is adapted to recognize selected device identification signals transmitted with control signals for a different device and to process said signals to generate said display and synthetic voice information.

9. A method for indicating the operating mode of a universal remote controller comprising the steps of:
   (a) receiving, in a first device, a signal from a universal remote controller, said signal comprising an device identification code and a control code, said signal being responsive to either keyboard or voice control by a user of said remote controller;
   (b) determining within said first device whether said device identification code conforms to said first device; and
   (c) indicating to a user by display and synthetic voice generation produced by said first device that said universal remote controller is not configured to control said first device but is configured to control a further device.

* * * * *